(12) United States Patent
Nomura (10) Patent No.: US 8,755,175 B2
(45) Date of Patent: Jun. 17, 2014

(54) OPERATION DEVICE

(75) Inventor: Hiroo Nomura, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 496 days.

(21) Appl. No.: 13/237,782

(22) Filed: Sep. 20, 2011

(65) Prior Publication Data

US 2012/0008266 A1    Jan. 12, 2012

Related U.S. Application Data

(63) Continuation of application No. PCT/JP2010/062423, filed on Jul. 23, 2010.

(30) Foreign Application Priority Data

Jul. 29, 2009    (JP) ................................. 2009-176231

(51) Int. Cl.
*H05K 5/00*      (2006.01)
*G02F 1/1333*    (2006.01)

(52) U.S. Cl.
USPC ................... 361/679.01; 361/679.22; 349/58; 349/60

(58) Field of Classification Search
USPC ..................... 361/679.01, 679.22; 349/58, 60
See application file for complete search history.

(56) References Cited

U.S. PATENT DOCUMENTS

| 5,621,311 | A | * | 4/1997 | Kamiya ......................... 324/156 |
| 5,808,707 | A | * | 9/1998 | Niibori et al. .................... 349/60 |
| 6,177,971 | B1 | * | 1/2001 | Jung et al. ....................... 349/60 |
| 6,654,078 | B1 | * | 11/2003 | Kato et al. ....................... 349/58 |
| 7,095,461 | B2 | * | 8/2006 | Kim ................................ 349/58 |
| 7,306,237 | B2 | * | 12/2007 | Tsuji et al. ..................... 277/644 |
| 7,561,225 | B2 | * | 7/2009 | Nakagawa et al. ............. 349/60 |
| 7,920,225 | B2 |   | 4/2011 | Nishikawa et al. |
| 7,975,870 | B2 | * | 7/2011 | Laule et al. .................... 220/582 |
| 8,023,064 | B2 | * | 9/2011 | Ono ................................ 349/60 |
| 8,068,331 | B2 | * | 11/2011 | Sauers et al. ............. 361/679.01 |
| 2006/0181517 | A1 |   | 8/2006 | Zadesky et al. |

(Continued)

FOREIGN PATENT DOCUMENTS

| JP | 6-059796 | 3/1994 |
| JP | 7-64725  | 3/1995 |

(Continued)

OTHER PUBLICATIONS

Search Report dated Aug. 31, 2010 from International Application No. PCT/JP2010/062423.

(Continued)

*Primary Examiner* — Adrian S Wilson
*Assistant Examiner* — Abhishek Rathod
(74) *Attorney, Agent, or Firm* — Beyer Law Group LLP (57) ABSTRACT

Mobile equipment includes an operation panel disposed in an opening of a case. The operation panel includes electrode layers that constitute a position detector. The operation panel and an internal member inside the case are provided with respective electrode layers that are opposite each other and constitute a press detector. An elastic member that supports the operation panel has a fixed portion secured to the case, a support portion configured to support the operation panel, and an elastic repulsive portion. When the operation panel is pressed, the magnitude of a reaction force against the pressing force can be adjusted to an appropriate level primarily by buckling or bending of the elastic repulsive portion.

13 Claims, 8 Drawing Sheets

(56) References Cited

U.S. PATENT DOCUMENTS

| | | |
|---|---|---|
| 2006/0250377 A1 | 11/2006 | Zadesky et al. |
| 2007/0064378 A1* | 3/2007 | Lo et al. .................. 361/681 |
| 2007/0222917 A1* | 9/2007 | Ono ......................... 349/65 |
| 2009/0079904 A1* | 3/2009 | Yada et al. ................ 349/60 |
| 2009/0168314 A1* | 7/2009 | Park et al. ............ 361/679.02 |
| 2010/0053854 A1 | 3/2010 | Nishikawa et al. |

FOREIGN PATENT DOCUMENTS

| | | |
|---|---|---|
| JP | 2000-347807 | 12/2000 |
| JP | 2004-151961 | 5/2004 |
| JP | 2006-209360 | 8/2006 |
| JP | 2006-323457 | 11/2006 |
| JP | 2009-145905 | 7/2009 |
| WO | 2007/091600 | 8/2007 |

OTHER PUBLICATIONS

Notification of Reason of Refusal dated Feb. 12, 2013 from Japanese Application No. 2011-524756.

* cited by examiner

OPERATION DEVICE

CLAIM OF PRIORITY

This application is a Continuation of International Application No. PCT/JP2010/062423 filed on Jul. 23, 2010, which claims benefit of Japanese Patent Application No. 2009-176231 filed on Jul. 29, 2009. The entire contents of each application noted above are hereby incorporated by reference.

BACKGROUND OF THE INVENTION

1. Field of the Invention

The present invention relates to an operation device included in electronic equipment, such as mobile equipment, and operated with the touch of a finger or the like on an operation panel.

2. Description of the Related Art

Patent documents described below disclose operation devices equipped with an operation panel. In such an operation device, an operation panel includes a position detector, such as a capacitive position detector, capable of detecting a position where a finger or the like touches the front surface of the operation panel. Additionally, a press detector capable of detecting a press of the operation panel is provided between a case and the operation panel. When the position detector detects a position where a finger or the like touches the operation panel and the press detector detects a press of the operation panel, the operation device outputs an operation signal corresponding to information about the position detected by the position detector.

With this operation, it is possible to reliably output an operation signal corresponding to information about a position touched by a finger or the like. At the same time, by pressing the operation panel with a finger or the like, the operator can easily recognize, by the feel, that the operation panel has been operated.

An operation device described in Japanese Unexamined Patent Application Publication No. 2006-323457 includes, as a press detector, a switch or a piezoelectric element that detects a press of an operation panel. Since the operation panel is movably attached to a case, a gap is often created between the operation panel and the case. This tends to cause entry of dust through the gap into the case.

In an operation device described in Japanese Unexamined Patent Application Publication No. 7-64725, an operation panel is supported by elastic members in the outer region thereof. When the operation panel is pressed, the elastic members are compressively deformed to allow the operation panel to move in the pressed direction. In an operation device described in International Publication No. 2007/091600, elastic members are pressure-sensitive conductive rubber members. Compression of the pressure-sensitive conductive rubber members causes a change in resistance, so that a press detection output can be obtained.

In the operation devices described in Japanese Unexamined Patent Application Publication No. 7-64725 and International Publication No. 2007/091600, the elastic members are interposed between a case and an inner surface of the operation panel. Since pressing the operation panel causes compressive deformation of the elastic members and produces a large elastic resistance, it is difficult to realize an appropriate feel of pressing operation. A better feel of pressing operation may be realized by lowering the hardness of the elastic members. However, this often degrades the strength of the elastic members and may result in inadequate sealing between the operation panel and the case.

The present invention solves the problems of the related art described above. The present invention provides an operation device in which an operation panel has a good press feel and it is possible to improve sealing between the operation panel and a case.

SUMMARY OF THE INVENTION

An operation device according to an aspect of the present invention includes a case having an opening and an operation panel disposed in the opening. In the operation device, a gap between a periphery of the opening and an edge of the operation panel is blocked by an elastic member. The elastic member has a fixed portion secured to an inner surface of the case, a support portion configured to support the operation panel, and an elastic repulsive portion formed between the fixed portion and the support portion. The elastic repulsive portion is configured to block the gap and give a restoring force to the operation panel pressed toward the inside of the case. The operation panel includes a position detector configured to detect a position where a front surface of the operation panel has been operated, the front surface being an operation surface of the operation panel. The case is internally provided with a press detector configured to detect that the operation panel has been pressed toward the inside of the case.

In the operation device described above, when a finger or the like touches the front surface of the operation panel, the position detector included in the operation panel detects a position touched by the finger or the like. Then, when the operation panel is pressed, the press detector operates to determine that a press operation has been performed at the position detected by the position detector.

Since the gap between the case and the operation panel is covered with the elastic repulsive portion of the elastic member, it is possible to protect the interior of the case from outside air. It is thus possible to easily prevent dust, water, and moisture from entering the interior of the case.

The elastic member has the fixed portion secured to the case, the support portion configured to support the operation panel, and the elastic repulsive portion formed between the fixed portion and the support portion and configured to cover the gap. The elastic repulsive portion, which primarily buckles or bends, can adjust a reaction force against the press of the operation panel to an appropriate level and allows the operation panel to have a good press feel.

According to another aspect of the present invention, the support portion of the elastic member is preferably located closer to the operation surface than the fixed portion is to the operation surface, and located inside the fixed portion in the opening; and the elastic repulsive portion preferably extends obliquely from the fixed portion toward the operation surface.

The elastic repulsive portion, which extends obliquely forward, buckles in response to a press of the operation panel and can produce an appropriate repulsive force. Additionally, even if the elastic member is disposed in a small area, the buckling of the elastic repulsive portion can ensure a larger pressing stroke of the operation panel and allows the operation panel to have a better press feel, as compared to those in the case where the elastic member is compressively deformed.

According to another aspect of the present invention, the case is preferably internally provided with an internal member, and the fixed portion of the elastic member is preferably held between a part of the case and the internal member.

When the fixed portion of the elastic member is held between the case and the internal member, a gap is less likely to be created at a joint between the case and the elastic member. Thus, a high level of sealing can be maintained by the elastic member.

According to another aspect of the present invention, a protrusion of the internal member is preferably fitted in a recess of the case.

With this configuration, the fixed portion of the elastic member can be secured to the case in the assembly process of mounting the internal member to the case.

According to another aspect of the present invention, the internal member preferably serves as a stopper when the operation panel is pressed toward the inside of the case.

When the internal member serves as a stopper, it is possible to regulate the amount of movement of the operation panel when it is pressed, and to set the amount of press of the operation panel to an optimum value.

According to another aspect of the present invention, the press detector may be disposed between the operation panel and the internal member.

For example, the press detector may be configured to detect a change in capacitance and may include electrodes opposite each other, the electrodes being disposed separately on the operation panel and the internal member.

The present invention makes it possible to seal a gap between the case and the operation panel. Thus, outside air and dust can be effectively prevented from entering the interior of the case through the gap. Additionally, with buckling or bending of the elastic member that blocks the gap, it is possible to adjust the magnitude of an elastic repulsive force against a press of the operation panel to an appropriate level and allow the operation panel to have a good press feel. Moreover, after the pressing force applied to the operation panel is released by the elastic repulsive force produced by buckling of the elastic member, the elastic member can be easily restored to the initial position.

DESCRIPTION OF THE PREFERRED EMBODIMENTS

Figure 1:
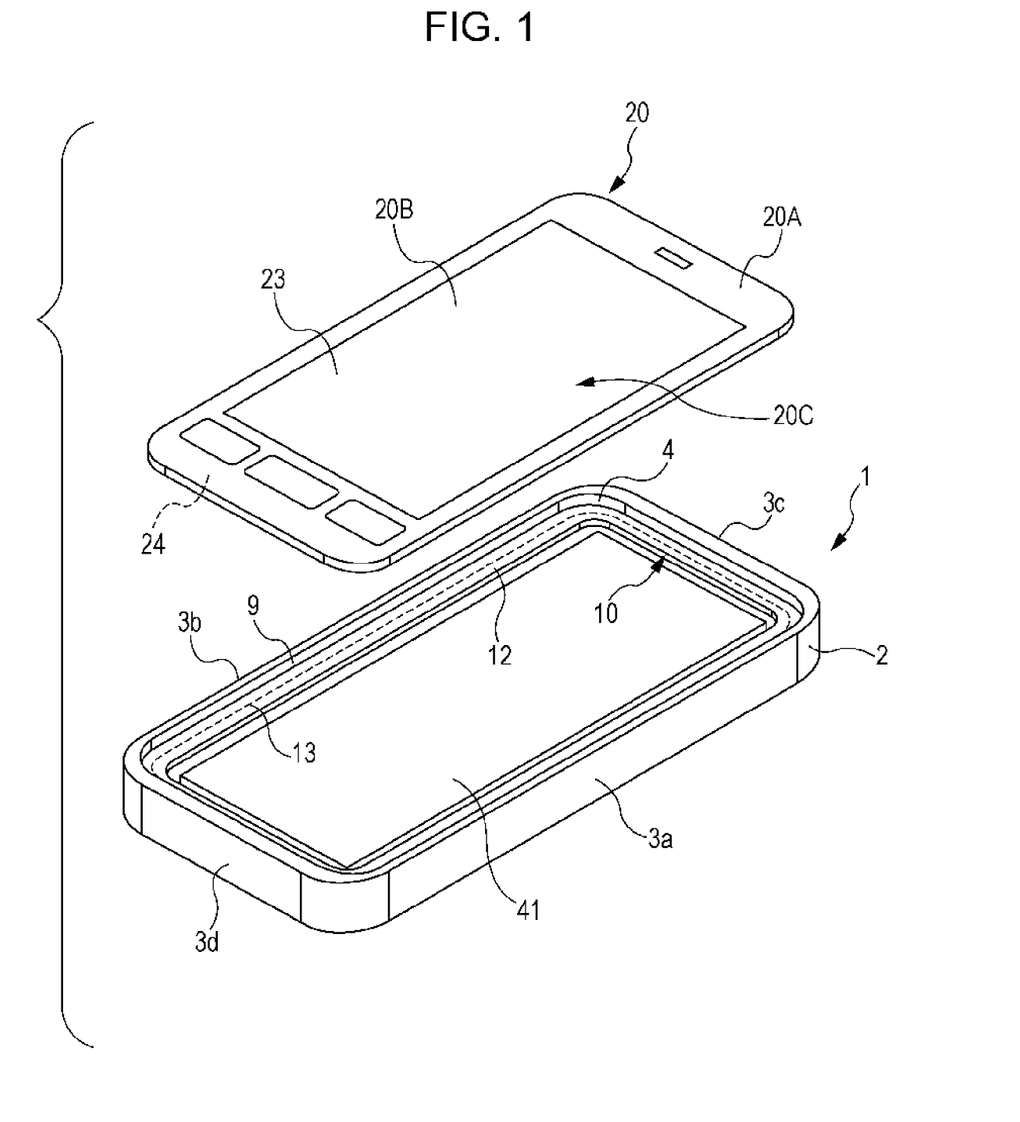
FIG. 1 is an exploded perspective view of mobile equipment including an operation device according to a first embodiment of the present invention.
Figure 2:
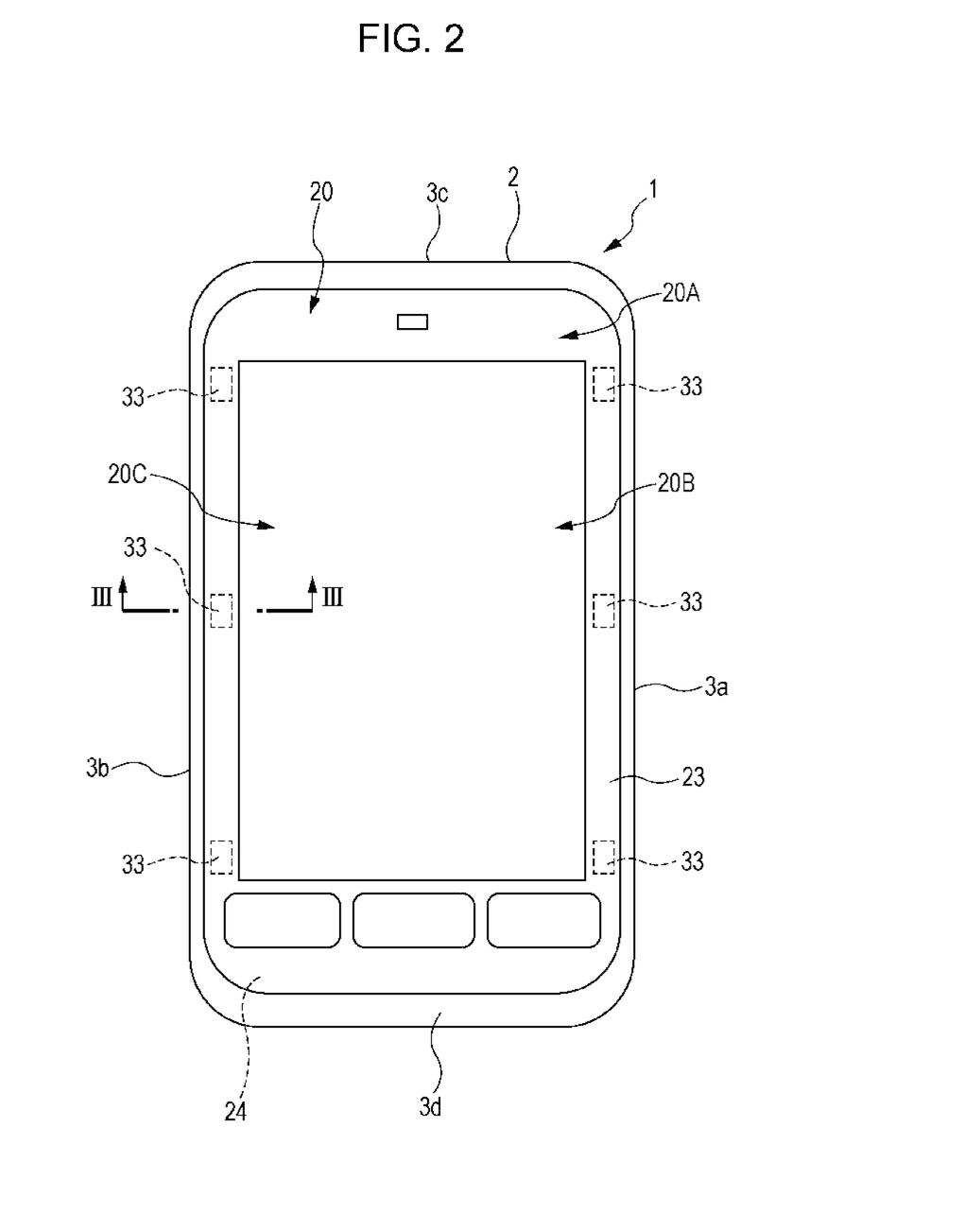
FIG. 2 is a front view of the operation device illustrated in FIG. 1.

Mobile equipment 1 illustrated FIG. 1 and FIG. 2 is used, for example, as a cellular phone, a portable information processor, a portable storage apparatus, or a portable game machine.

The mobile equipment 1 includes a case 2 made of synthetic resin material. The case 2 has a right side wall 3*a*, a left side wall 3*b*, an upper side wall 3*c*, and a lower side wall 3*d*. A front part of the case 2 is an opening 4 surrounded by the side walls 3*a*, 3*b*, 3*c*, and 3*d*. The opening 4 is substantially rectangular in shape.

Figure 3:
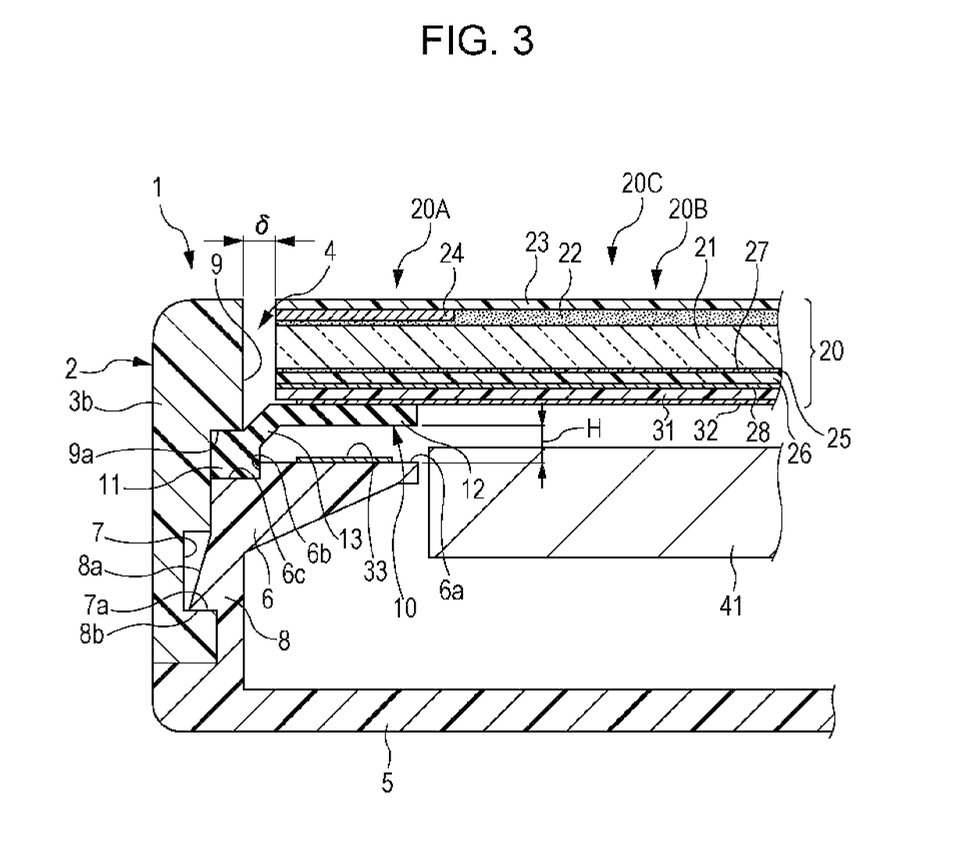
FIG. 3 is an enlarged cross-sectional view of the operation device, the view being taken along line III-III of FIG. 2.

As illustrated in FIG. 3, a back cover 5 made of synthetic resin material is attached to the case 2 from the back side. Thus, an opening on the back side of the case 2 is covered with the back cover 5. An internal member 6 that extends toward the inside of the case 2 is formed integrally with the back cover 5. The internal member 6 is in close contact with the inner surfaces of the right side wall 3*a*, the left side wall 3*b*, the upper side wall 3*c*, and the lower side wall 3*d* of the case 2.

As illustrated in FIG. 3, the case 2 has recesses 7 at a plurality of points in the inner surfaces of the right side wall 3*a* and the left side wall 3*b*, or in the inner surfaces of the upper side wall 3*c* and the lower side wall 3*d*. The internal member 6 has an integrally-formed protrusion 8 that protrudes laterally. The protrusion 8 has an inclined portion 8*a* and an anchoring portion 8*b*. The inclined portion 8*a* is inclined such that it protrudes more laterally as it approaches the back cover 5. The anchoring portion 8*b* is substantially parallel to the back cover 5.

When the internal member 6 is inserted through the opening on the back side of the case 2 into the interior of the case 2, the internal member 6 deforms while allowing the protrusion 8 to slide along the inner surfaces of the right side wall 3*a*, the left side wall 3*b*, the upper side wall 3*c*, and the lower side wall 3*d*. When the protrusion 8 is fitted into the recesses 7, the anchoring portion 8*b* is retained on inner end faces 7*a* on the lower side of the recesses 7. Thus, the back cover 5 is securely snapped into the case 2.

As illustrated in FIG. 3, a periphery of the opening 4 of the case 2 has an integrally-formed retaining protrusion 9 that protrudes from the inner surfaces of the side walls 3*a*, 3*b*, 3*c*, and 3*d* toward the inside of the case 2. The retaining protrusion 9 has a step portion 9*a* on the lower side thereof. The step portion 9*a* is recessed toward the inside of the side walls 3*a*, 3*b*, 3*c*, and 3*d*. The retaining protrusion 9 and the step portion 9*a* extend continuously along the entire periphery of the opening 4.

As illustrated in FIG. 1, the case 2 is provided with a frame-like elastic member 10 along the periphery of the opening 4, that is, along the inner surfaces of the right side wall 3*a*, the left side wall 3*b*, the upper side wall 3*c*, and the lower side wall 3*d*. For example, the elastic member 10 is made of silicone rubber, which is highly resistant to corrosion and has stable elastic properties.

As illustrated in FIG. 3, the elastic member 10 has an integrally-formed fixed portion 11 which is rectangular in cross section. Before the back cover 5 is attached to the case 2, the elastic member 10 is inserted into the case 2 through the opening on the back side of the case 2. Then, the fixed portion 11 is pressed against the step portion 9*a* on the lower side of the retaining protrusion 9. When the back cover 5 is attached to the case 2 and the internal member 6 integral with the back cover 5 is inserted into the case 2, the fixed portion 11 of the elastic member 10 is fitted to a retaining step portion 6*b* in the upper part of the internal member 6. Thus, the fixed portion 11 is vertically sandwiched and retained between a bottom 6c of the retaining step portion 6b and the step portion 9a formed around the opening 4 of the case 2.

As illustrated in FIG. 3, when the protrusion 8 of the internal member 6 is fitted in the recesses 7 in the side walls 3a and 3b or in the side walls 3c and 3d of the case 2, the back cover 5 is tightly secured to the case 2 and the fixed portion 11 of the elastic member 10 is vertically sandwiched and firmly retained between the case 2 and the internal member 6. The fixed portion 11, which is fitted to the retaining step portion 6b of the internal member 6, is held in place and does not move toward the center of the case 2 (i.e., does not move rightward in FIG. 3).

As illustrated in FIG. 3, the elastic member 10 has a support portion 12 inside the fixed portion 11. An elastic repulsive portion 13, which is elastically deformable, is integrally formed between the fixed portion 11 and the support portion 12. As illustrated in FIG. 1, the fixed portion 11, the support portion 12, and the elastic repulsive portion 13 are formed as a single frame that extends continuously along the entire periphery of the opening 4 of the case 2.

The support portion 12 is substantially parallel to the back cover 5. As illustrated in FIG. 3, the support portion 12 may be located forward of the fixed portion 11. In other words, the support portion 12 may be spaced from the fixed portion 11 toward an operation surface 20C which is a front surface of an operation panel 20. At the same time, the support portion 12 may be located inside the fixed portion 11 in the case 2 (i.e., located to the right of the fixed portion 11 in FIG. 3). Thus, as illustrated in the cross section of FIG. 3, the elastic repulsive portion 13 may extend obliquely from the fixed portion 11 to the support portion 12. That is, the elastic repulsive portion 13 may be inclined to be separated from the side walls 3a, 3b, 3c, and 3d, with increasing distance from the back cover 5 toward the front. Therefore, the elastic repulsive portion 13 buckles when the support portion 12 is pressed toward the back cover 5.

As illustrated in FIG. 1, the operation panel 20 is disposed in the opening 4 of the case 2.

The operation panel 20 is identical in contour to the opening 4 of the case 2 but is slightly smaller in size than the opening 4. As illustrated in FIG. 3, when the operation panel 20 is mounted inside the opening 4, a small gap 8 is created between the outer edge of the operation panel 20 and the periphery of the opening 4. The gap 8 is preferably 0.3 mm or less, and more preferably 0.1 mm or less.

As illustrated in FIG. 3, the lower surface of the operation panel 20 is securely bonded to the upper surface of the support portion 12 of the elastic member 10. This allows the operation panel 20 to be supported by the elastic member 10 and, at the same time, allows the gap δ to be internally blocked by the elastic repulsive portion 13 of the elastic member 10.

As illustrated in FIG. 3, the operation panel 20 includes a substrate 21 made of hard light-transmissive synthetic resin material. In the present specification, the term "light-transmissive" refers to the property of allowing an image displayed by a display unit 41, such as a liquid-crystal display unit, inside the case 2 to be viewed therethrough.

A decorative film 23 is bonded to the front surface of the substrate 21, with a light-transmissive adhesive layer 22 interposed therebetween. The decorative film 23 is a light-transmissive film. A decorative layer 24 is formed, for example, by printing or painting in the outer region of the lower surface of the decorative film 23. As illustrated in FIG. 1 and FIG. 2, in the operation panel 20, a region where the decorative layer 24 is provided is a shielding region 20A and a region where the decorative layer 24 is not provided is a transmitting region 20B. An image displayed by the display unit 41 can be transmitted and viewed in the transmitting region 20B. The interior of the case 2 is shielded and not visible in the shielding region 20A. The front surface of the operation panel 20, mainly in the transmitting region 20B, is an operation surface 20C where the mobile equipment 1 is operated with the touch of a finger on the operation panel 20.

Figure 8:
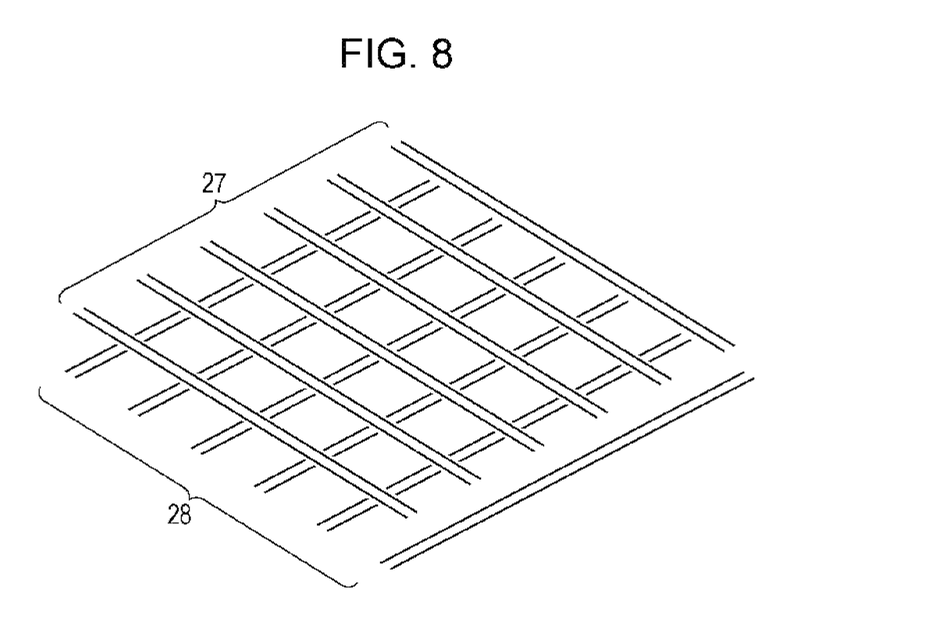
FIG. 8 illustrates a structure of a capacitive position detector.

As illustrated in FIG. 3, a detecting film 26 is bonded to the lower surface of the light-transmissive substrate 21, with an adhesive layer 25 interposed therebetween. The detecting film 26 is provided with electrode layers 27 and 28 on both sides thereof. The detecting film 26 is a light-transmissive synthetic resin film. The electrode layers 27 and 28 are formed by patterning a light-transmissive conductive material, such as indium tin oxide (ITO). The detecting film 26 and the electrode layers 27 and 28 constitute a position detector. As illustrated in FIG. 8, the electrode layer 27 includes a plurality of band electrodes or linear electrodes arranged in parallel, and the other electrode layer 28 also includes a plurality of band electrodes or linear electrodes arranged in parallel. The electrode layer 27 and the electrode layer 28 are oriented orthogonal to each other, with the detecting film 26 interposed therebetween. One of the electrode layers 27 and 28 serves as an X electrode layer, and the other serves as a Y electrode layer.

Figure 10:
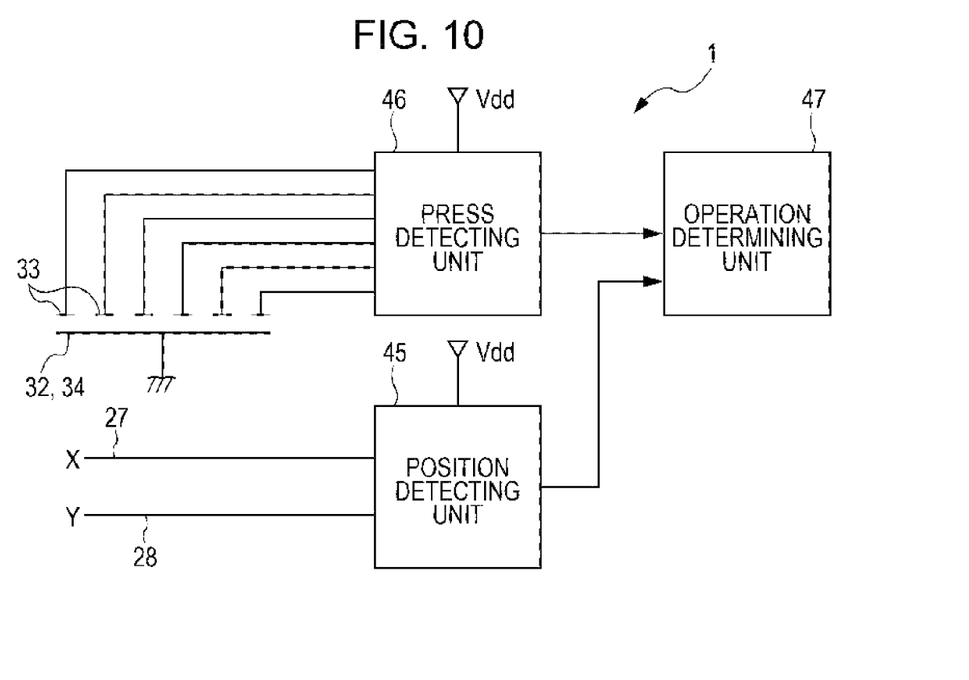
FIG. 10 is a circuit block diagram of an operation device.

The position detector described above is a capacitive position detector. As illustrated in FIG. 10, a position detecting unit 45 sequentially applies pulsed voltages to a plurality of electrodes included in one of the electrode layers 27 and 28. At this point, a current that flows instantaneously through a plurality of electrodes of the other electrode layer is detected. When a finger, which is a conductive body, touches the front surface of the decorative film 23, a capacitance between the finger and the electrode layer 27 is added to a capacitance between the electrode layer 27 and the electrode layer 28. This results in a change in current that flows through the electrode layer 28, as compared to that in the case where the finger does not touch the decorative film 23. The position detecting unit 45 sequentially applies voltages to the plurality of electrodes of the electrode layer 27, and sequentially applies voltages to the plurality of electrodes of the electrode layer 28 such that there is no overlap in time. By obtaining the above-described current detected in each of the electrode layers 27 and 28, it is possible to calculate the position touched by the finger.

As illustrated in FIG. 3, a lower layer film 31 is disposed inside the electrode layer 28 constituting the position detector. Specifically, the lower layer film 31 is bonded to the electrode layer 28, with an adhesive layer interposed therebetween. A shield electrode layer 32 is formed over the entire back surface of the lower layer film 31 facing the back cover 5. The lower layer film 31 is a light-transmissive film. The shield electrode layer 32 is made of light-transmissive conductive material, such as ITO. Since the shield electrode layer 32 is interposed between the position detector and the display unit 41, a current that flows through the display unit 41 can be prevented from adversely affecting the detecting operation of the position detector.

As illustrated in FIG. 3, the internal member 6 is located below the decorative layer 24 and extends along the inner surfaces of all the side walls 3a, 3b, 3c, and 3d of the case 2. The upper surface of the internal member 6 is a press detecting surface 6a parallel to the lower surface of the operation panel 20. When the operation panel 20 is not pressed, the lower surface of the support portion 12 of the elastic member 10 is parallel to the press detecting surface 6a, with a distance H of about 0.1 mm to 0.3 mm therebetween. When the operation panel 20 is pressed and allows the support portion 12 of the elastic member 10 to come into contact with the press detecting surface 6a, the operation panel 20 cannot move further inside the case 2. Thus, the press detecting surface 6a may serve also as a stopper for the operation panel 20.

Figure 4:
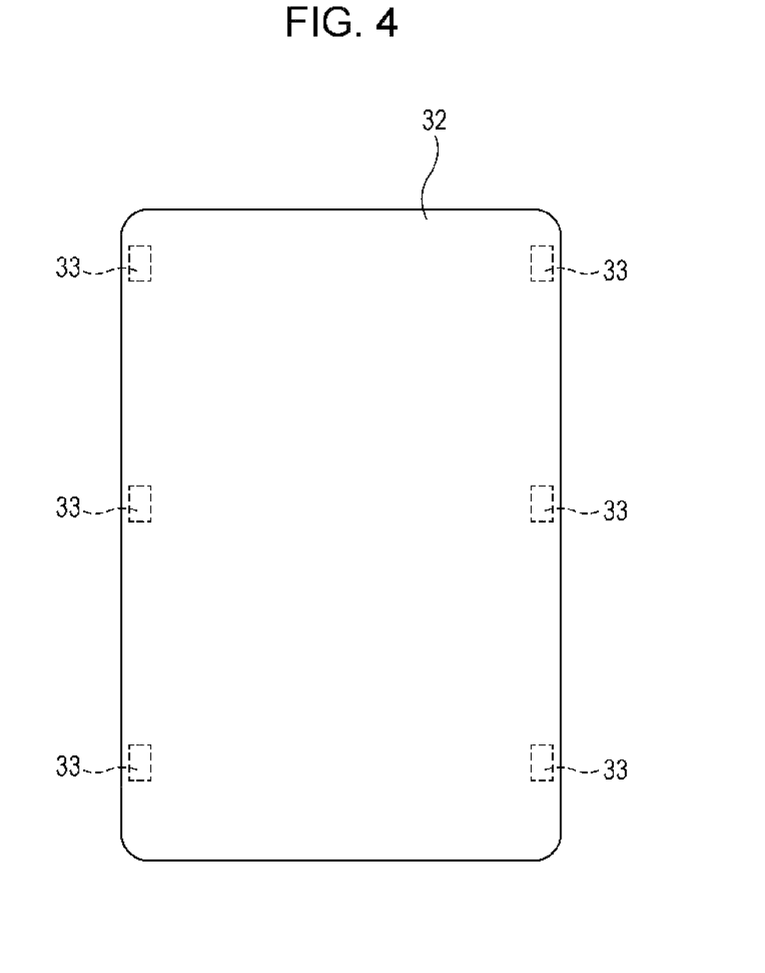
FIG. 4 is a plan view of a shield electrode layer and counter electrode layers constituting a press detector included in the operation device of FIG. 3.

As illustrated in FIG. 3, a counter electrode layer 33 is disposed on the press detecting surface 6a of the internal member 6. The counter electrode layer 33 is provided at multiple locations along the periphery of the opening 4 of the case 2. Referring to FIG. 2 and FIG. 4, in the present embodiment, there are counter electrode layers 33 at six different locations where the counter electrode layers 33 are covered with the decorative layer 24.

As illustrated in FIG. 3, each of the counter electrode layers 33 faces the shield electrode layer 32, with the support portion 12 of the elastic member 10 interposed therebetween. The counter electrode layers 33 at six different locations and the shield electrode layer 32 constitute the press detector. In the press detector, a circuit of a press detecting unit 46 illustrated in FIG. 10 constitutes a differentiating circuit which includes a capacitor formed by the counter electrode layers 33 and the shield electrode layer 32. The press detecting unit 46 repeatedly applies a voltage, such as a pulsed voltage, to each of the counter electrode layers 33 for a short time at regular intervals. From each of the counter electrode layers 33, a delay in current rise in the differentiating circuit is detected. When the operation panel 20 is pressed and the distance and capacitance between the shield electrode layer 32 and each of the counter electrode layers 33 change, a time at which the current rises changes. The press detecting unit 46 detects this change to determine whether the operation panel 20 has been pressed.

Times at which the counter electrode layers 33 are energized are assigned such that there is no overlap with times at which the electrode layers 27 and 28 constituting the position detector are energized. Voltages are sequentially applied to the plurality of counter electrode layers 33.

An image displayed by the display unit 41 inside the case 2 can be viewed from outside the mobile equipment 1 in the transmitting region 20B where the decorative layer 24 is not provided in the operation panel 20. When a finger touches the operation surface 20C (front surface) of the operation panel 20 in accordance with the displayed image, the position touched by the finger is detected by the position detector including the electrode layers 27 and 28 opposite each other and the position detecting unit 45 illustrated in FIG. 10. Then, the corresponding information is transmitted to an operation determining unit 47. When the operation panel 20 is pressed in this operation, the resulting change in distance between the shield electrode layer 32 and each of the counter electrode layers 33 is detected by the press detecting unit 46 and the corresponding information is transmitted to the operation determining unit 47. When the press detecting unit 46 detects the press of the operation panel 20, the operation determining unit 47 determines that an operation at the position touched by the finger has been executed. Then, an operation signal is generated which is determined by a relationship between the image displayed by the display unit 41 and the position touched by the finger.

The press detector includes the counter electrode layers 33 provided at six different locations. If the sum of detection signals obtained from the respective counter electrode layers 33 exceeds a predetermined value, the press detecting unit 46 determines that the operation panel 20 has been pressed. The position where the operation panel 20 has been pressed can be estimated by comparing the detection signals obtained from the respective counter electrode layers 33.

As illustrated in FIG. 3, the gap 8 between the outer edge of the operation panel 20 and the periphery of the opening 4 of the case 2 is blocked by the elastic member 10. This can protect the interior of the case 2 from outside air and prevent dust from entering the interior of the case 2. It is also possible to prevent water from entering the space between the counter electrode layers 33 and the shield electrode layer 32 of the press detector, and causing inconvenience, such as an abnormal change in capacitance between the counter electrode layers 33 and the shield electrode layer 32.

When the operation panel 20 is pressed toward the inside of the case 2, the elastic member 10 compressively deforms. At the same time, the elastic repulsive portion 13 buckles between the fixed portion 11 and the support portion 12. Then, a repulsive force against the buckling gives an elastic restoring force that restores the operation panel 20 to the original position. Thus, the elastic member 10 provides an elastic restoring force produced not only by compressive deformation but also by buckling or bending. Therefore, when touching the front surface of the operation panel 20 with a finger, the operator can press the operation panel 20 toward the inside of the case 2 with a little force. Additionally, the operation panel 20 has a good press feel and can realize a stable restoring operation.

In the embodiment described above, the press detector includes the counter electrode layers 33 and the shield electrode layer 32 facing each other and detects a change in capacitance therebetween. However, the press detector is not limited to this.

Figure 5:
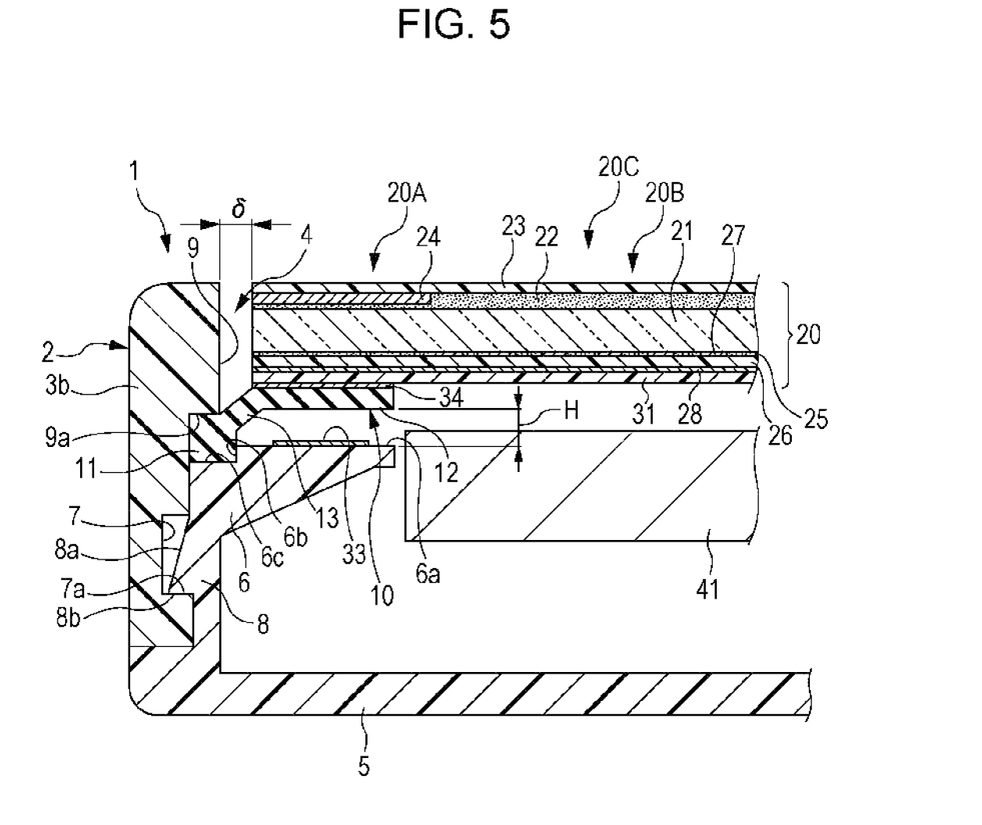
FIG. 5 is an enlarged cross-sectional view of an operation device according to a second embodiment of the present invention.
Figure 6:
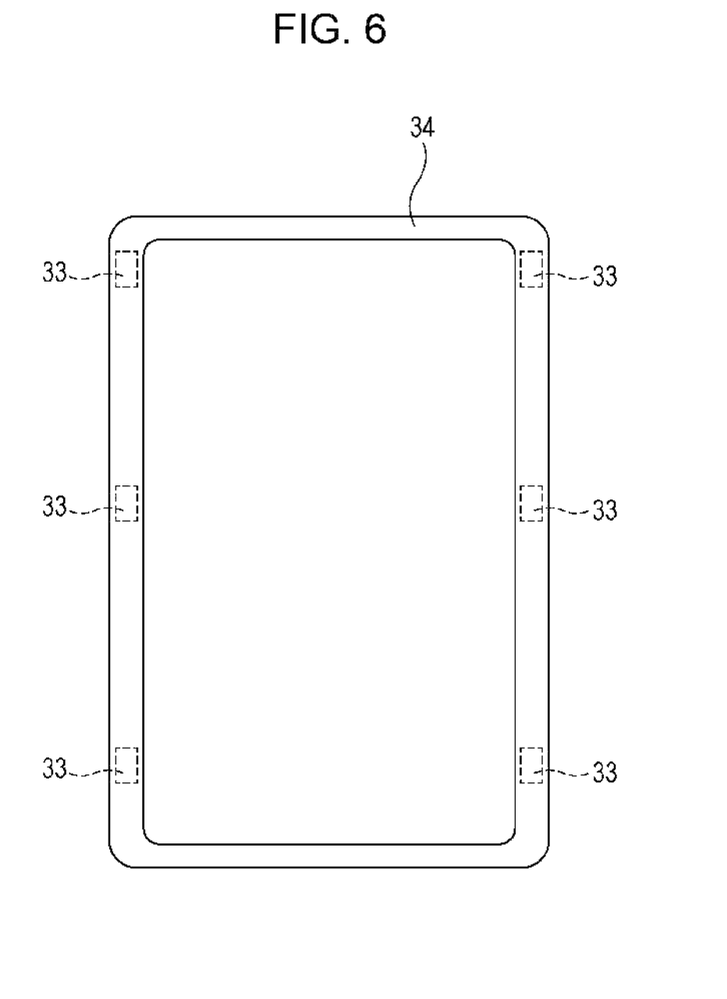
FIG. 6 is a plan view of a common electrode layer and counter electrode layers constituting a press detector included in the operation device of FIG. 5.

In a second embodiment illustrated in FIG. 5 and FIG. 6, a common electrode layer 34 formed of a frame-like pattern is disposed on the back surface of the lower layer film 31 of the operation panel 20. Each of the counter electrode layers 33 at six different locations faces the common electrode layer 34. Thus, in the second embodiment, the counter electrode layers 33 and the common electrode layer 34 are included in the press detector.

The common electrode layer 34 is formed in an area hidden under the decorative layer 24. The common electrode layer 34 extends continuously along the inner surfaces of all the side walls 3a, 3b, 3c, and 3d of the case 2. In the press detector, for example, the common electrode layer 34 is set to the ground potential. A voltage is sequentially and intermittently applied to each of the counter electrode layers 33. Then, the press detecting unit 46 detects whether the operation panel 20 has been pressed.

The common electrode layer 34, which is formed in an area hidden under the decorative layer 24 and is not provided in the transmitting region 20B, does not necessarily have to be a transparent electrode layer. The common electrode layer 34 may be a conductive metal layer, such as a silver or metal layer.

The shield electrode layer 32 illustrated in FIG. 3 may be formed on the lower layer film 31 in addition to the common electrode layer 34, or may be formed at a level different from that of the common electrode layer 34. Alternatively, it is possible not to provide the shield electrode layer 32.

Figure 7:
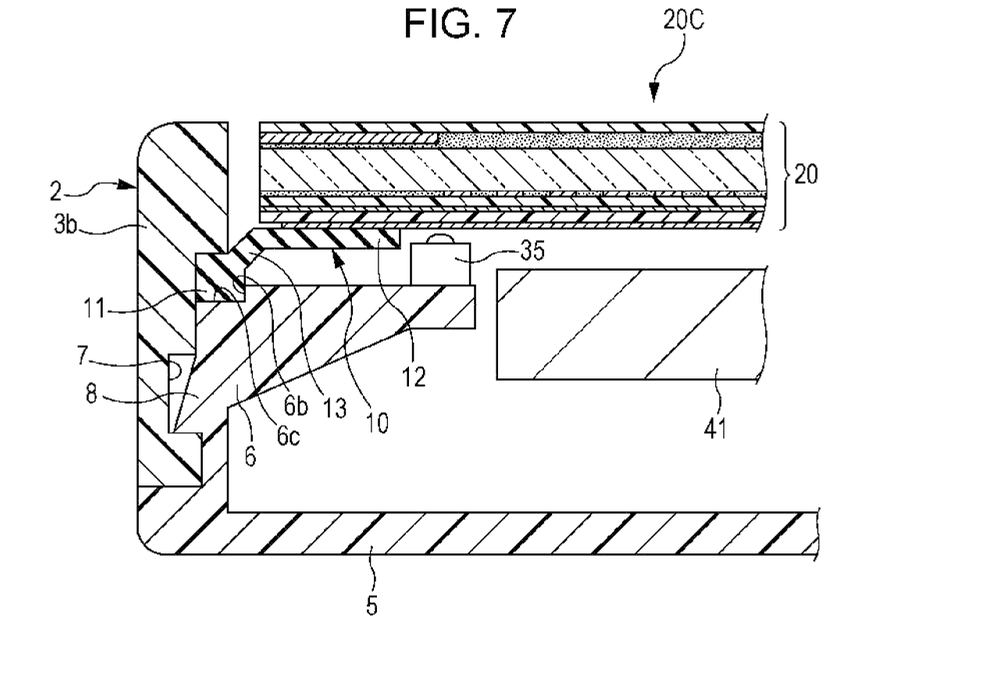
FIG. 7 is an enlarged cross-sectional view of an operation device according to a third embodiment of the present invention.

In a third embodiment illustrated in FIG. 7, the press detector between the operation panel 20 and the internal member 6 may include a piezoelectric element 35. When the operation panel 20 is pressed and the resulting strain is transmitted to the piezoelectric element 35, the piezoelectric element 35 generates power and detects the press of the operation panel 20.

The press detector may include a deforming portion configured to deform when the operation panel 20 is pressed and a strain gauge configured to detect the deformation.

Figure 9:
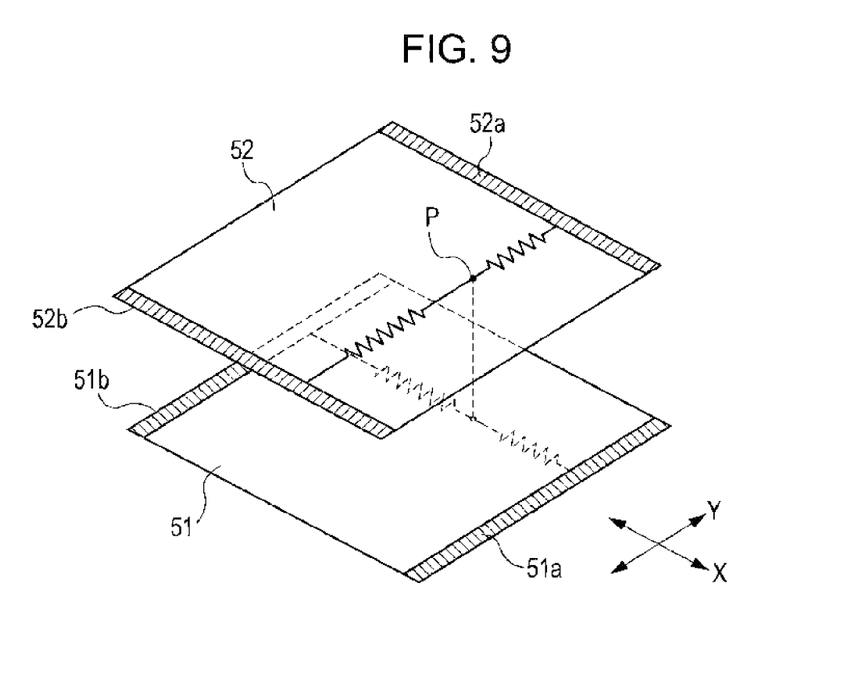
FIG. 9 illustrates a structure of a resistive position detector.

The position detector included in the operation panel 20 may not be limited to a capacitive position detector such as that of the embodiments described above, and may be a resistive position detector such as that illustrated in FIG. 9. The resistive position detector of FIG. 9 includes a light-transmissive lower conductive layer 51 provided with electrode layers 51a and 51b of silver paste or the like on opposite ends thereof, and an upper conductive layer 52 provided with electrode layers 52a and 52b on opposite sides thereof. The lower conductive layer 51 has a uniform resistance between the electrode layers 51a and 51b, and the upper conductive layer 52 has a uniform resistance between the electrode layers 52a and 52b. The upper conductive layer 52 is formed on a flexible light-transmissive sheet. There is an air space between the lower conductive layer 51 and the upper conductive layer 52.

During operation, a voltage is applied between the electrode layers 51a and 51b, and a voltage is applied between the electrode layers 52a and 52b at timing different from that for the electrode layers 51a and 51b. When the above-described sheet is pressed and bent by touching the front surface of the operation panel 20 with a finger, and then the upper conductive layer 52 and the lower conductive layer 51 are brought into contact with each other at point P, a voltage corresponding to a resistance determined by dividing the lower conductive layer 51 in the X direction is obtained from the electrode layers 51a and 51b, and a voltage corresponding to a resistance determined by dividing the upper conductive layer 52 in the Y direction is obtained from the electrode layers 52a and 52b. This allows detection of the position of point P in the X-Y coordinate system.

When the resistive position detector detects the position touched by the finger and the press detector detects that the operation panel 20 has been pressed, an operation signal corresponding to the position touched by the finger is generated.

What is claimed is:

1. An operation device comprising:
   a case having an opening;
   an operation panel disposed in the opening, the operation panel having an operation surface which is an upper surface thereof, the operation panel including a position detector configured to detect a position where the operation surface has been operated, wherein a gap is formed between an inner periphery of the case and an outer edge of the operation panel;
   an elastic member disposed along an inner surface of the case so as to block the gap, wherein; the elastic member includes:
      a fixed portion secured to the inner surface of the case;
      a support portion configured to support the operation panel; and
      an elastic repulsive portion formed between the fixed portion and the support portion, the elastic repulsive portion being and configured to provide a restoring force to the operation panel when the operation panel is pressed toward an inside of the case;
   a press detector provided in the case, configured to detect that the operation panel has been pressed toward the inside of the case; and
   an internal member provided in the case, wherein the internal member includes a protrusion engaged with a recess of the case, and the fixed portion of the elastic member is held between a part of the case and the internal member.

2. The operation device according to claim 1, wherein the elastic repulsive portion extends obliquely from the fixed portion toward the operation panel, and the support portion is located under a lower surface of the operation panel.

3. The operation device according to claim 2, further comprising:
   an internal member provided in the case below the elastic member, the internal member including a press detecting surface extending along the support portion of the elastic member,
   wherein the press detector includes:
      an electrode formed on the lower surface of the operation panel; and
      at least one counter electrode formed on the press detecting surface.

4. The operation device according to claim 3, wherein the electrode formed on the lower surface of the operational panel and the at least one counter electrode form a capacitor with the support portion of the elastic member interposed therebetween.

5. The operation device according to claim 4, wherein a capacitance of the capacitor changes when the elastic repulsive portion of the member bends as the operational panel is pressed downward.

6. The operation device according to claim 3, wherein the press detecting surface of the internal member also serves as a stopper when the operation panel is pressed downward.

7. The operation device according to claim 1, wherein the internal member serves as a stopper when the operation panel is pressed toward the inside of the case.

8. The operation device according to claim 1, wherein the press detector is disposed between the operation panel and the internal member.

9. The operation device according to claim 8, wherein the press detector is configured to detect a change in capacitance and includes electrodes opposite each other, the electrodes being disposed separately on the operation panel and the internal member.

10. The operation device according to claim 8, wherein the press detector includes a piezoelectric element.

11. The operation device according to claim 1, wherein the press detector includes:
   a deforming portion configured to deform when the operation panel is pressed; and
   a strain gauge configured to detect the deformation.

12. The operation device according to claim 1, wherein the elastic repulsive portion of the elastic member is located along the inner periphery of the case so as to block the gap.

13. The operation device according to claim 1, wherein the elastic repulsive portion of the elastic member bends by buckling deformation when the support portion moves downward as the operation panel is pressed.

* * * * *